United States Patent
Santos-Gomez

(10) Patent No.: US 9,418,178 B2
(45) Date of Patent: Aug. 16, 2016

(54) CONTROLLING A SIZE OF HIERARCHICAL VISUALIZATIONS THROUGH CONTEXTUAL SEARCH AND PARTIAL RENDERING

(75) Inventor: Lucinio Santos-Gomez, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1196 days.

(21) Appl. No.: 13/280,121

(22) Filed: Oct. 24, 2011

(65) Prior Publication Data

US 2013/0104088 A1   Apr. 25, 2013

(51) Int. Cl.
*G06F 3/048* (2013.01)
*G06F 17/30* (2006.01)

(52) U.S. Cl.
CPC ............................... *G06F 17/30994* (2013.01)

(58) Field of Classification Search
CPC ................ G06F 17/30058; G06F 17/30961; G06F 17/30994; G06F 17/3002; G06F 3/0482; G06F 3/0481; G06F 17/30327
See application file for complete search history.

(56) References Cited

U.S. PATENT DOCUMENTS

| | | | |
|---|---|---|---|
| 4,468,728 A * | 8/1984 | Wang | 715/234 |
| 6,341,280 B1 * | 1/2002 | Glass et al. | 707/754 |
| 6,484,190 B1 * | 11/2002 | Cordes et al. | 715/207 |
| 7,363,593 B1 | 4/2008 | Loyens et al. | |
| 7,437,686 B1 | 10/2008 | Bernstein et al. | |
| 7,505,965 B2 | 3/2009 | Ivanov | |
| 7,664,727 B2 | 2/2010 | Van Doan et al. | |
| 2007/0198930 A1 | 8/2007 | Chu et al. | |
| 2010/0106726 A1 | 4/2010 | Huitema | |
| 2010/0333039 A1 | 12/2010 | Denkel | |

* cited by examiner

*Primary Examiner* — Jeffrey A Gaffin
*Assistant Examiner* — Ayesha Huertas Torres
(74) *Attorney, Agent, or Firm* — Convergent Law Group LLP

(57) ABSTRACT

Exemplary embodiments disclose controlling of the size and content of a hierarchical visualization by a software component executing on a computer that displays a multi-level hierarchical visualization of nodes including a collapsed sub-hierarchy. The exemplary embodiments include displaying a user interface that enables a user to invoke a contextual search that is contextual to the collapsed sub-hierarchy; responsive to the user invoking the contextual search, receiving search criteria entered by the user; displaying any nodes from the collapsed sub-hierarchy matching the search criteria; receiving a user selection of which ones of the matching nodes from the collapsed sub-hierarchy to show; and displaying a partial rendering of the collapsed sub-hierarchy that shows the selected matching nodes while keeping remaining non-matching nodes hidden.

6 Claims, 6 Drawing Sheets

CONTROLLING A SIZE OF HIERARCHICAL VISUALIZATIONS THROUGH CONTEXTUAL SEARCH AND PARTIAL RENDERING

BACKGROUND

Hierarchical systems organize objects into multiple levels arranged in a tree like structure where each level of objects may be linked to objects in the level below. A common example of a hierarchical system in computers is a file system in which directories contain both files and subdirectories. Such file organization is called a hierarchical file system. In addition to file systems, many data sets or data structures for strong information are hierarchical in form.

Hierarchical data sets and systems may be managed using different types of graphical user interfaces that visualize hierarchical structures such as trees. For example, a tree widget is a type of tool for managing and visualizing hierarchical data sets that expand and collapse portions of the data.

FIGS. 1A and 1B are diagrams illustrating conventional visualizations of hierarchical data sets. Branches and sub-branches of the trees can be expanded and collapsed either programmatically or by the user to display or hide the information contained therein. As a specific object in the data set is located, a user may expand the parent object. In the case of a large data set with deep hierarchies, expanding the tree may result in a large number of unintended objects displayed along the expansion path. The resulting large visualization of the hierarchy and the user interaction thereof can be complex and difficult to manage on conventional screens. The large visualization has to be scrolled in and out as additional objects are located and users target additional objects and actions. This problem is exacerbated when a larger visualization is viewed on handheld devices with smaller screens.

Accordingly, a need exists for an improved method and system for controlling the size of a hierarchical visualization.

BRIEF SUMMARY

Exemplary embodiments disclose controlling of the size and content of a hierarchical visualization by a software component executing on a computer that displays a multi-level hierarchical visualization of nodes including a collapsed sub-hierarchy. The exemplary embodiments include displaying a user interface that enables a user to invoke a contextual search that is contextual to the collapsed sub-hierarchy; responsive to the user invoking the contextual search, receiving search criteria entered by the user; displaying any nodes from the collapsed sub-hierarchy matching the search criteria; receiving a user selection of which ones of the matching nodes from the collapsed sub-hierarchy to show; and displaying a partial rendering of the collapsed sub-hierarchy that shows the selected matching nodes while keeping remaining non-matching nodes hidden.

DETAILED DESCRIPTION

The exemplary embodiment relates to methods and systems for controlling the size and content of a hierarchical visualization. The following description is presented to enable one of ordinary skill in the art to make and use the invention and is provided in the context of a patent application and its requirements. Various modifications to the exemplary embodiments and the generic principles and features described herein will be readily apparent. The exemplary embodiments are mainly described in terms of particular methods and systems provided in particular implementations. However, the methods and systems will operate effectively in other implementations. Phrases such as "exemplary embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The exemplary embodiments will also be described in the context of particular methods having certain steps. However, the method and system operate effectively for other methods having different and/or additional steps and steps in different orders that are not inconsistent with the exemplary embodiments. Thus, the present invention is not intended to be limited to the embodiments shown, but is to be accorded the widest scope consistent with the principles and features described herein.

The exemplary embodiments provide methods and systems for controlling the size and content of a hierarchical visualization. The exemplary embodiments comprise a hierarchal visualization component executing on a computer that displays a user interface, which enables a user to invoke a contextual search on a particular collapsed sub-hierarchy such that a scope of the search is limited to the collapsed sub-hierarchy only based search criteria entered by the user. The user interface then displays a partial rendering of the collapsed sub-hierarchy that shows the selected matching nodes while keeping remaining non-matching nodes hidden. In a further embodiment, the user interface may display nodes from the collapsed sub-hierarchy that match the search criteria and receive a user selection of which ones of the matching nodes from the collapsed sub-hierarchy to show in the partial rendering.

Figure 1A:
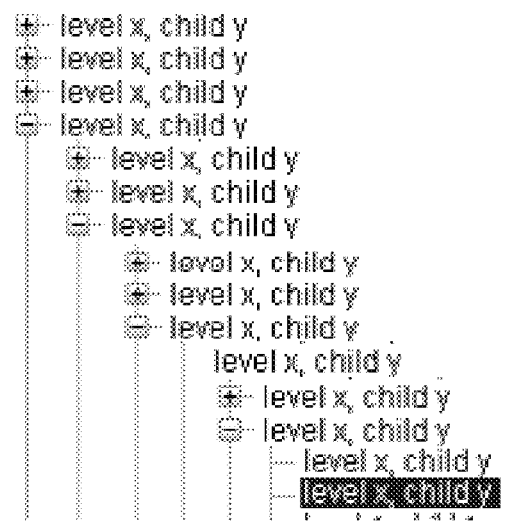
FIGS. 1A and 1B are diagrams illustrating conventional visualizations of hierarchical data sets.
Figure 1B:
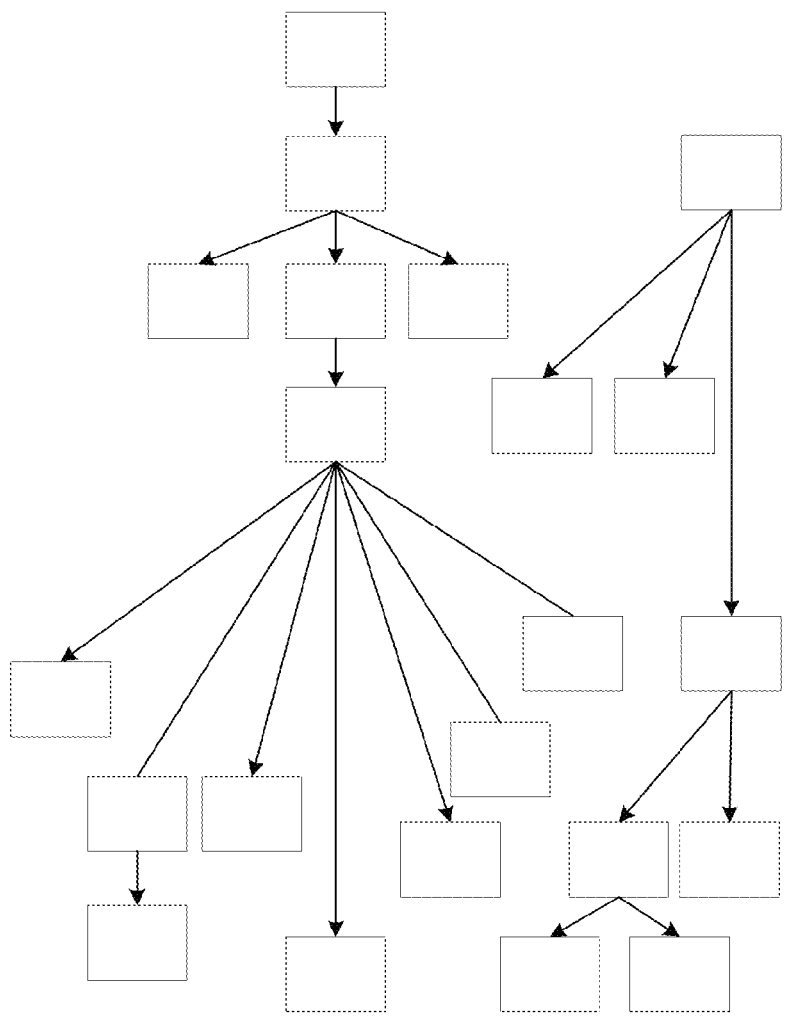
Figure 2A:
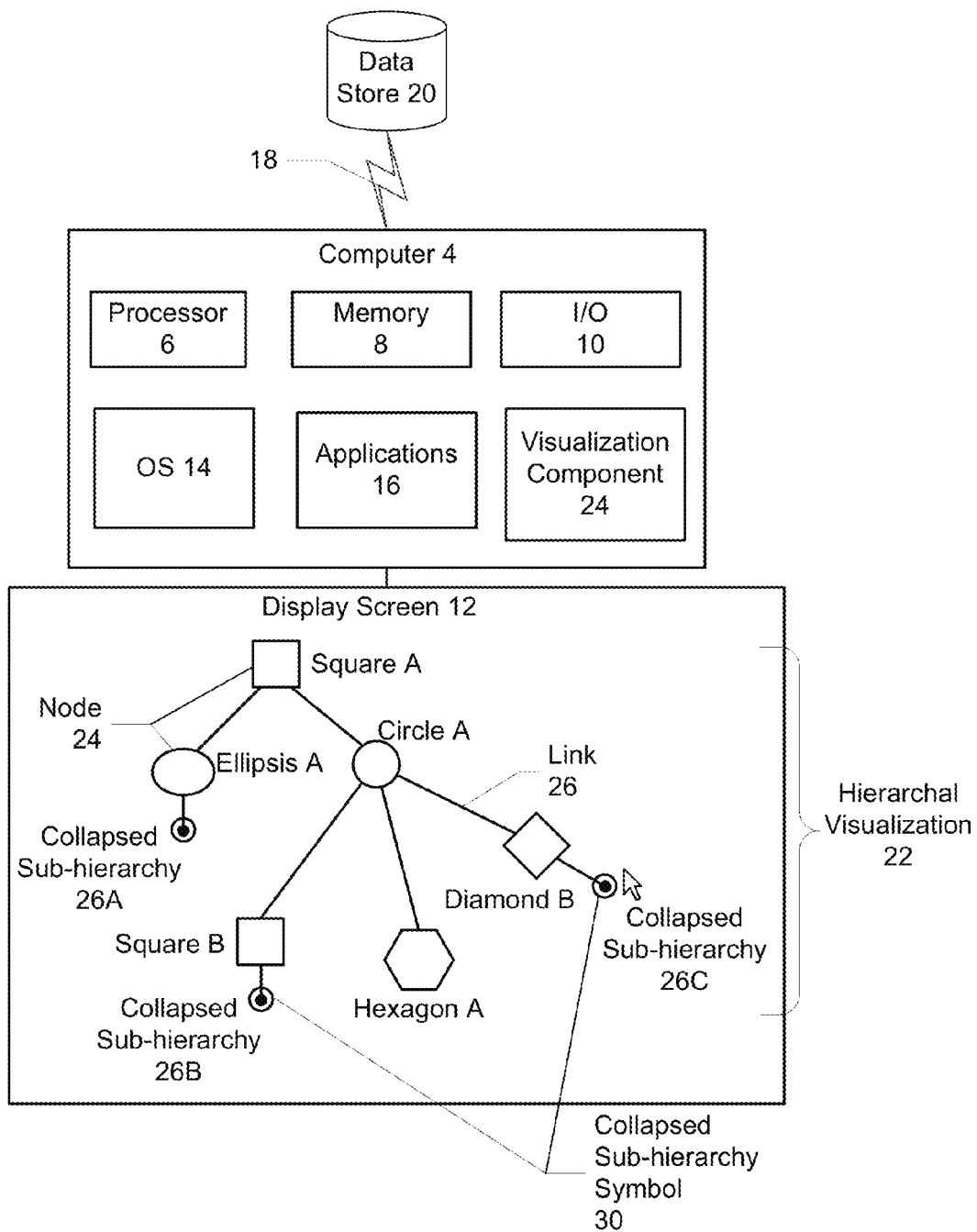
FIG. 2A is a logical block diagram illustrating an exemplary embodiment for a system that controls the size and content of a hierarchical visualization.

FIG. 2A is a logical block diagram illustrating an exemplary embodiment for a system that controls the size and content of a hierarchical visualization. The system 2 includes a computer 4 having at least one processor 6, a memory 8, an input/output (I/O) 10, and a display screen 12 coupled together via a system bus (not shown). The computer 4 may exist in various forms, including a smart or mobile phone, a tablet computer, a personal computer (PC), (e.g., desktop, laptop, or notebook), a personal digital assistant (PDA), a set-top box, a game system, and the like. In some embodiments, the computer 4 may be configured as a server. The computer 4 may include other hardware components of typical computing devices (not shown), including input devices (e.g., keyboard, pointing device, microphone for voice commands, buttons, touch screen, etc.), and output devices (e.g., speakers, and the like). The computer 4 may include computer-readable media, e.g., memory and storage devices (e.g., flash memory, hard drive, optical disk drive, magnetic disk drive, and the like) containing computer instructions that implement the functionality disclosed when executed by the processor. The computer 4 may further include wired or wireless network communication interfaces for communication.

The processor 6 may be part of data processing system suitable for storing and/or executing software code including an operating system (OS) 14, various applications 16 (such as a web browser, a word processor, a drawing program, and the like), and a visualization component 24. The processor 20 may be coupled directly or indirectly to elements of the memory 8 through a system bus (not shown). The memory elements can include local memory employed during actual execution of the program code, bulk storage, and cache memories which provide temporary storage of at least some program code in order to reduce the number of times code must be retrieved from bulk storage during execution.

The input/output 10 or I/O devices (including but not limited to keyboards, displays, pointing devices, etc.) can be coupled to the system either directly or through intervening I/O controllers. Network adapters (not shown) may also be coupled to the system. Modems, cable modems and Ethernet cards are just a few of the currently available types of network adapters. The network adapters enable the data processing system to become coupled to other data processing systems, including remote printers or storage devices through intervening private or public networks 18. For example, the computer 4 may be coupled to a remote data store 20 to access hierarchal data sets.

During execution of the operating system 14, the applications 16 and/or the visualization component (hereinafter collectively referred to as "the software") may retrieve data from a data store 20 and display the data on a display screen 12 as a hierarchal visualization 22.

An example of a hierarchal visualization 22 is a tree. A tree is a widely-used data structure that emulates a hierarchical tree structure with multiple levels of linked nodes 24, where each node has zero or more children nodes. In this example, individual nodes 24 are shown here using representative square, circle, ellipse, and hexagon shapes. A node 24 that has a child is called the child's parent node (or ancestor node, or superior). The node at the top of the tree is typically called a root node. All other nodes in the tree can be reached from the root nod by following edges or links 26 from node-to-node through the levels of the tree. Each node 24 may include zero or more sub-nodes on one or more levels, and thus may represent a sub-hierarchy of other nodes.

Another example of a hierarchal visualization is a nested list that shows the parent-child relations of its elements. As used herein, a hierarchal visualization 22 is intended to cover any type of data structure that has hierarchal parent-child relationships between its nodes, including but not limited to trees, nested lists and graphs.

A hierarchal visualization 22 may include one or more collapsed sub-hierarchies (shown as collapsed sub-hierarchies 26A, 26B, and 26C, collectively referred to as collapsed sub-hierarchy 26), the content of which is hidden and not displayed. According to one aspect of the exemplary embodiment, the visualization component 24 is configured display a collapsed sub-hierarchy 26 using a symbol that is not applied to regular node 24, i.e., a node that does not contain a sub-hierarchy. For example, in one embodiment, a collapsed sub-hierarchy 26 may be represented using a collapsed sub-hierarchy symbol 30 as shown.

A user interacts with the software with a pointing device, such as a mouse or stylus, and/or a finger in the case of a touch screen. For example, a collapsed sub-hierarchy 26 can be expanded (and then collapsed again) either programmatically or by the user to display (or hide) its contents. For example, a collapsed sub-hierarchy 26 can be expanded and its nodes revealed in response a user clicking or tapping a pointer (e.g., a cursor or a finger) on the collapsed sub-hierarchy symbol 30. Another click or tap of the collapsed sub-hierarchy with the pointer may collapse the expanded sub-hierarchy 26, hiding and replacing the nodes within with a collapsed sub-hierarchy symbol 30.

Figure 2B:
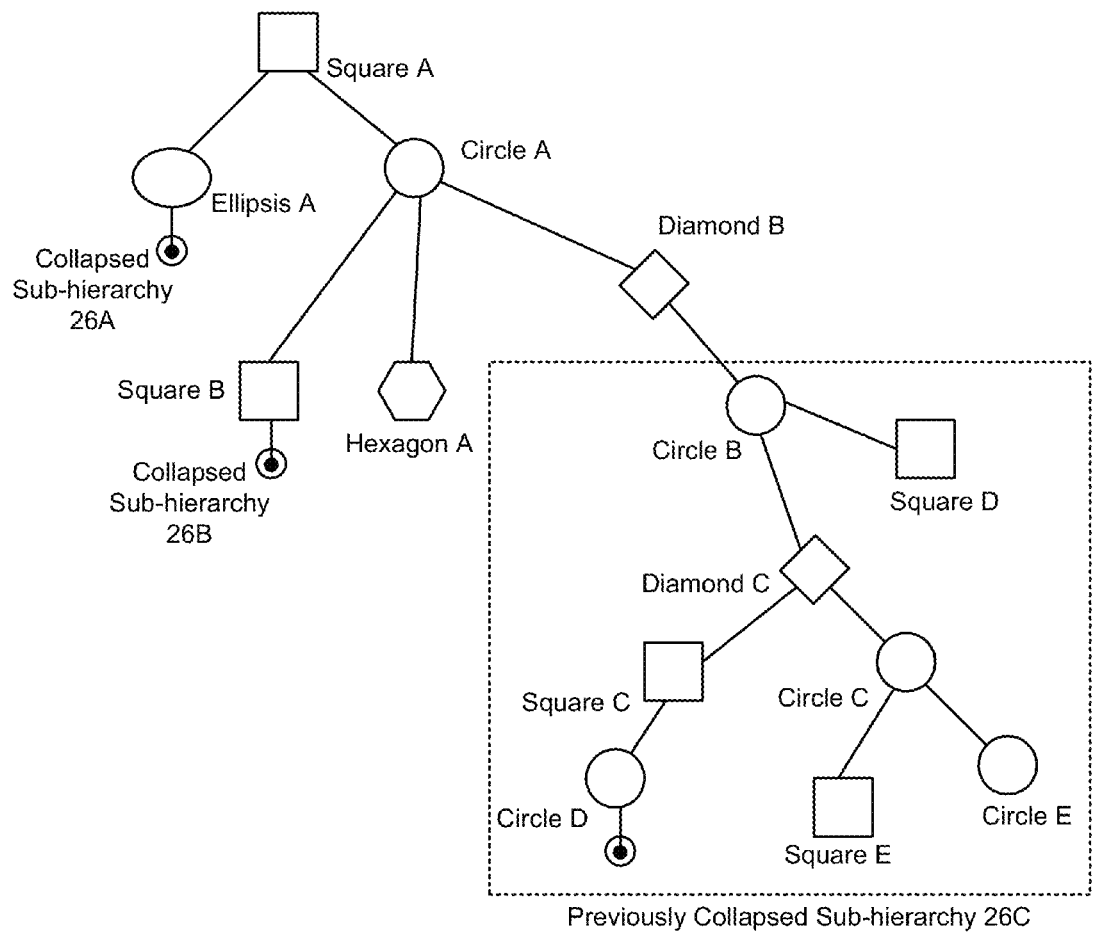
FIG. 2B is a diagram illustrating an example hierarchical visualization after a user has clicked on a collapsed sub-hierarchy symbol to expand its sub-hierarchy.

FIG. 2B is a diagram illustrating an example hierarchical visualization 200 after a user has clicked on the collapsed sub-hierarchy symbol 30 underneath the node labeled "Diamond B" to expand sub-hierarchy 26C, which reveals the hidden nodes within.

Regardless of the type of hierarchal visualization 22, in the case of a large data set with deep hierarchies, expanding collapsed sub-hierarchies 26 may result in a large number of unintended nodes displayed along the expansion path. The resulting large visualization of the hierarchy and the user interaction thereof can be complex and difficult for a user to manage.

According to the exemplary embodiments, the visualization component 24 is further configured to enable a user to limit the size of hierarchal visualization 22 and to control the contents of the hierarchal visualization 22 by invoking a search on a particular collapsed sub-hierarchy 26 that operates within the scope of the collapsed sub-hierarchy 26 in the context of which such search is invoked, rather than the entire hierarchal visualization. This is referred to throughout this document as a contextual search. In response, the user selects which ones of the sub-nodes meeting the search criteria should be shown, and the visualization component 24 partially expands the collapsed sub-hierarchy 26 to show only the sub-nodes the user selected.

In one embodiment, the visualization component 24 may be implemented as a standalone application that displays the hierarchal visualization 22 and enables the user to control the size of the hierarchal visualization 22 through contextual node searches and partial expansion. In other embodiments, the visualization component 24 could be implemented as a plug-in to an application 16 that displays the hierarchal visualization 22. Although the visualization component 24 is shown as a single component, the functionality of the visualization component 24 may be implemented into a greater number of modules/components.

Figure 3:
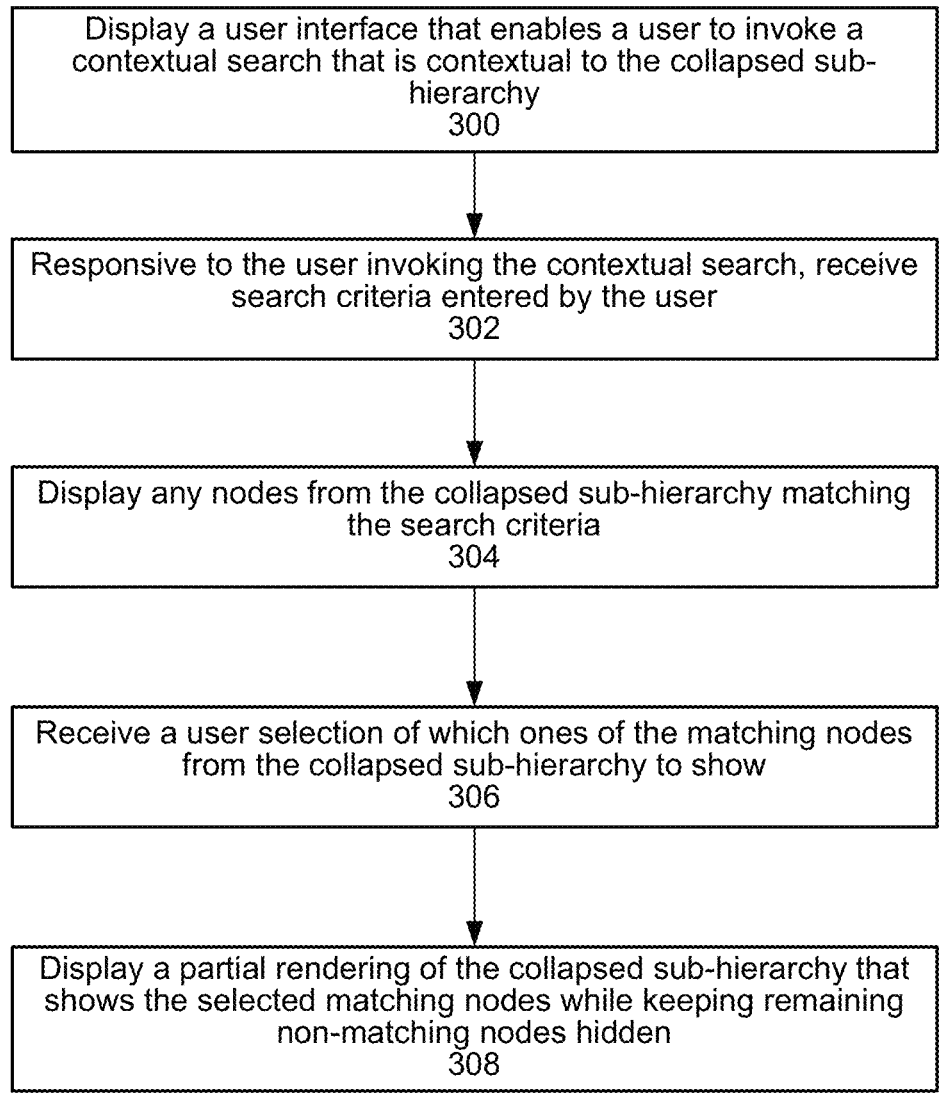
FIG. 3 is a flow diagram illustrating one embodiment of a process for controlling a size of a hierarchical visualization.

FIG. 3 is a flow diagram illustrating one embodiment of a process for controlling a size of a hierarchical visualization. The process is performed by a software component (e.g., the visualization component 24 or a combination of an application 16 and the visualization component 24) that displays a multi-level hierarchical visualization 22 of nodes that includes a collapsed sub-hierarchy.

The process may begin by displaying a user interface that enables a user to invoke a contextual search that is contextual to the collapsed sub-hierarchy (step 300). The contextual search is a search that operates within the boundaries of the collapsed sub-hierarchy from which the search is invoked. Responsive to the user invoking the contextual search, the software component receives search criteria entered by the user (step 302).

In one embodiment, the user may invoke the contextual search by performing a user gesture on the collapsed hierarchy symbol of a collapsed sub-hierarchy, including a mouse hover over or a right click. The user interface may be configured to respond to the user gesture by displaying a contextual search dialog box for receiving the search criteria entered by the user.

Figure 4A:
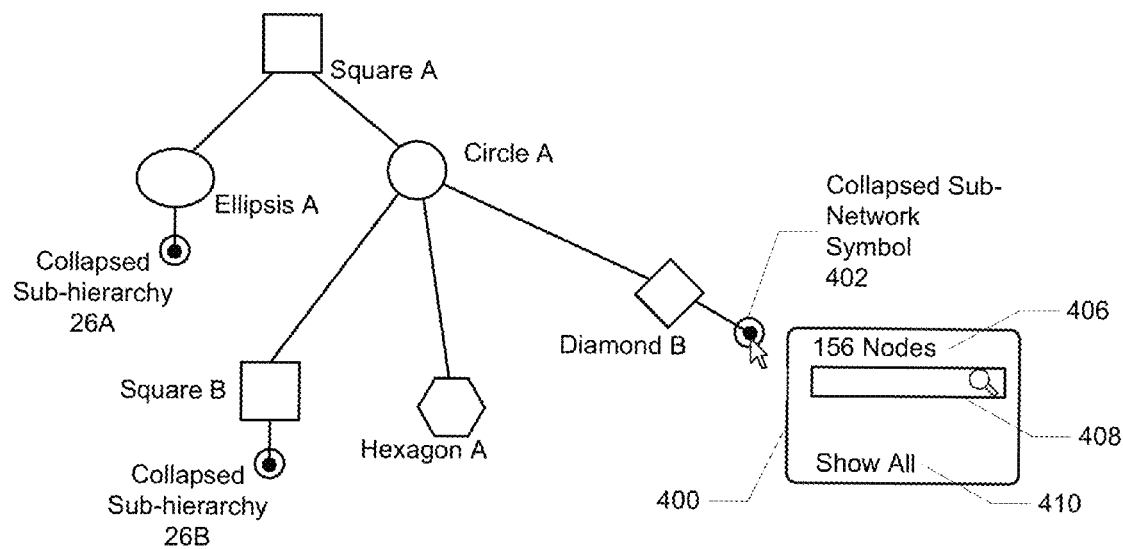
FIGS. 4A-4D are diagrams illustrating an example of a user entering contextual search criteria for the collapsed sub-hierarchy into a search dialog displayed by the visualization component and the resultant partial rendering of the collapsed sub-hierarchy.

FIGS. 4A-4D are diagrams illustrating an example of a user entering contextual search criteria for the collapsed sub-hierarchy into a search dialog displayed by the visualization component and the resultant partial rendering of the collapsed sub-hierarchy. FIG. 4A is a diagram illustrating a contextual search dialog that may displayed by the visualization component 24. In one embodiment the contextual search dialog 400 may be displayed as a window or box located adjacent to the collapsed hierarchy symbol 402 of a collapsed sub-hierarchy. The contextual search dialog 400 may be configured to display a text entry field 408 for entering search criteria, and optionally a total number of hidden nodes 406 comprising the collapsed sub-hierarchy and a "Show All" button 410. In another embodiment, the search dialog may display predetermined search criteria for the user to select, rather than enter.

Figure 4B:
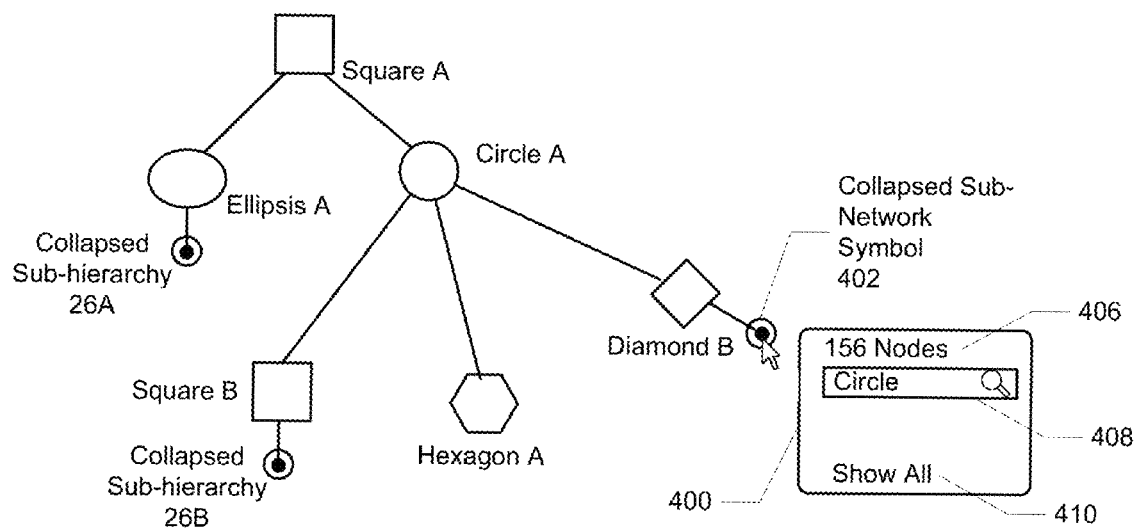

FIG. 4B is diagram illustrating an example of the user entering search criteria into the text entry field 408 of the contextual search dialog 400. In this example, the user has entered the term "Circle" into the text entry field 408.

Referring again to FIG. 3, the software component then displays any nodes from the collapsed sub-hierarchy that match the search criteria (304). Once the user enters the search criteria, the visualization component 24 performs a partial search of only the collapsed sub-hierarchy 26 represented by the collapsed sub-hierarchy symbol 402 for hidden nodes containing the search criteria, which in this case is the term "Circle." The search results 412 may be displayed within the search dialog 400 or alternatively other dialog or window.

Figure 4C:
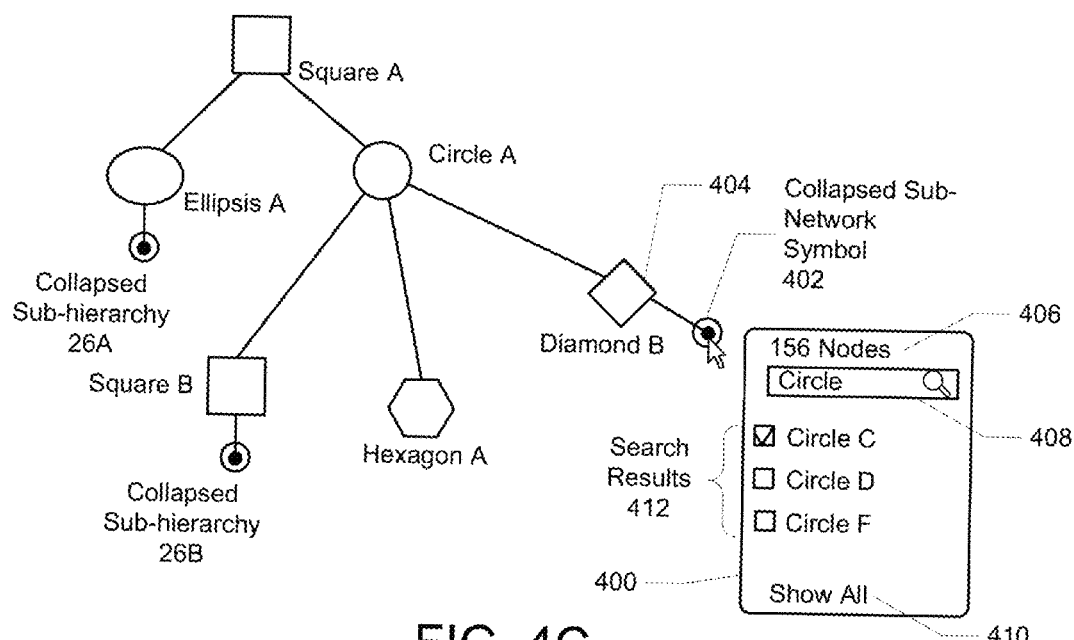

FIG. 4C shows the search results returned from the example search, which in one embodiment is a subset of nodes from the collapsed sub-hierarchy returned from the partial search that match the search criteria. In the example shown, the search results 412 include the names of three nodes, Circle C, Circle D and Circle F.

Referring again to FIG. 3, the software component receives a user selection of which ones of the matching nodes from the collapsed sub-hierarchy to show (Step 306). As shown in FIG. 4C, in one embodiment, the search dialog 400 may display check boxes next to the matching nodes displayed in the search results 412 so the user can check off which nodes should be shown. In this example, the user has selected the node named "Circle C." Alternatively, the user may click on the "Show All" button to have all the nodes from the search results shown.

Referring again to FIG. 3, the software component displays a partial rendering of the collapsed sub-hierarchy that shows the selected matching nodes while keeping remaining non-matching nodes hidden (step 308).

Figure 4D:
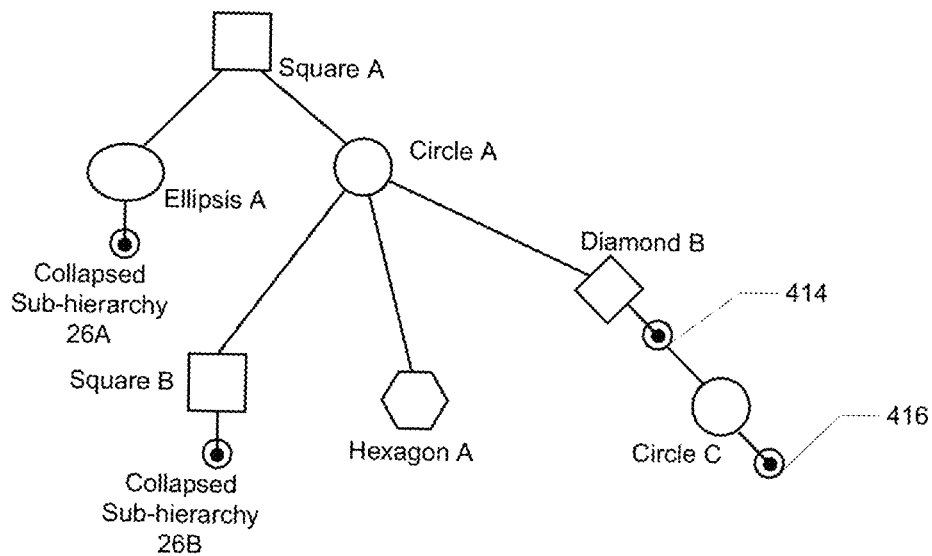

FIG. 4D is a diagram illustrating the example hierarchal visualization showing how the node selected and searched for, "Circle C," is displayed, while other nodes in the collapsed sub-hierarchy from which the search was invoked remain collapsed. The collapsed sub-hierarchy symbol 414 is displayed connected to node "Circle C" via a link. Other nodes not matching the partial search, such as nodes "Circle D" and "Square C" are not shown in the hierarchal visualization.

As shown, only the matching/found nodes (searched for) are represented in the hierarchal visualization as nodes. Other nodes linked to the found/target node(s) are displayed as a collapsed sub-hierarchy using the collapsed sub-hierarchy symbol, with one collapsed sub-hierarchy symbol for every link stemming from the found/target node(s). This means that there is a collapsed sub-hierarchy symbol for every link stemming from the matching/found node(s). The only time a node (other than the target node) would be represented as an individual node after a contextual search, is when such node is the only node linked to the target node.

In the example shown in FIG. 4D, since the matching/found node "Circle C" has both input and output links, there are two collapsed sub-hierarchy symbols 414 and 416 representing the sub-hierarchies linked to that matching/found node. Thus, the exemplary embodiments continue minimizing the size of a previously collapsed sub-hierarchy after a search so that only the node being searched is shown and the other nodes remain collapsed and represented as collapsed sub-hierarchies.

In one embodiment, however, there is one circumstance when a node other than a matching/found node may be displayed after a context search. That is when there is a single node behind a link stemming to the matching/found node. This is because when there is only one node to collapse, there is no economy in collapsing and visualizing a single node using a symbol representation of a collapsed sub-hierarchy rather than the node itself. For example, referring to the hierarchy shown in FIG. 2B, if Square E didn't exist and Circle E was the only node linked to circle C in its outgoing link, then in this embodiment, Circle E itself could be displayed instead of the sub-hierarchy symbol 416.

Thus, the exemplary embodiment provides a user interface that enables the user to perform a contextual search on a particular collapsed sub-hierarchy and a visual mechanism to selectively display previously hidden nodes and their relationships, thus controlling the size and the contents of the hierarchal visualization.

A method and system for method for controlling a size and content of a hierarchical visualization has been disclosed. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium that may include, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, partly on the user's computer and partly on a remote computer or entirely on the remote computer or server.

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A computer-implemented method for controlling a size and content of a hierarchical visualization by a software component executing on a computer, the method performed by the software component, comprising:

displaying a multi-level hierarchical visualization of nodes, including a node representing a collapsed sub-hierarchy that is displayed using a collapsed sub-hierarchy symbol that is not applied to regular nodes;

responsive to a user invoking a contextual search by performing a user gesture on the collapsed sub-hierarchy symbol, displaying a contextual search dialog box located adjacent to the collapsed hierarchy symbol that displays a text entry field for the user to enter search criteria that is contextual only to the collapsed sub-hierarchy, wherein the contextual search dialog further displays a total number of hidden units comprising the collapsed sub-hierarchy;

responsive to the user entering the search criteria, displaying search results comprising any nodes from the collapsed sub-hierarchy matching the search criteria, wherein the search results are displayed directly in the contextual search dialog box to control the size of the hierarchical visualization;

receiving a user selection of which ones of the matching nodes from the collapsed sub-hierarchy to show in the hierarchical visualization; and displaying a partial rendering of the collapsed sub-hierarchy that shows the selected matching nodes while keeping remaining non-matching nodes hidden, wherein other nodes linked to the matching nodes representing a collapsed sub-hierarchy are displayed using the collapsed sub-hierarchy symbol that is not applied to regular nodes.

2. The method of claim 1, wherein displaying any nodes from the collapsed sub-hierarchy matching the search criteria further comprises:

performing a partial search of only the collapsed sub-hierarchy for hidden nodes containing the search criteria; and displaying in the contextual search dialog a subset of the nodes from the collapsed sub-hierarchy returned from the partial search that match the search criteria.

3. An executable software product stored on a non-transitory computer-readable medium containing program instructions for controlling a size and content of a hierarchical visualization of nodes including a collapsed sub-hierarchy, the program instructions for:

displaying a multi-level hierarchical visualization of nodes, including a node representing a collapsed sub-hierarchy that is displayed using a collapsed sub-hierarchy symbol that is not applied to regular nodes;

responsive to a user invoking a contextual search by performing a user gesture on the collapsed sub-hierarchy symbol displaying a contextual search dialog box located adjacent to the collapsed hierarchy symbol that displays a text entry field for the user to enter a search criteria that is contextual only to the collapsed sub-hierarchy, wherein the contextual search dialog further displays a total number wherein the contextual search dialog further displays a total number of hidden units comprising the collapsed sub-hierarchy;

responsive to the user entering the criteria, displaying search results comprising any nodes from the collapsed sub-hierarchy matching the search criteria wherein the search results are displayed directly in the contextual search dialog box to control the size of the hierarchical visualization;

receiving a user selection of which ones of the matching nodes from the collapsed sub-hierarchy to show in the hierarchical visualization:

and displaying a partial rendering of the collapsed sub-hierarchy that shows the selected matching nodes while keeping remaining non-matching nodes hidden, wherein other nodes linked to the matching nodes representing a collapsed sub-hierarchy are displayed using the collapsed sub-hierarchy symbol that is not applied to regular nodes.

4. The executable software product of claim 3, wherein the instructions for displaying any nodes from the collapsed sub-hierarchy matching the search criteria further comprises instructions for:

performing a partial search of only the collapsed sub-hierarchy for hidden nodes containing the search criteria; and displaying in the contextual search dialog a subset of the nodes from the collapsed sub-hierarchy returned from the partial search that match the search criteria.

5. A computer, comprising:

a memory;

a processor coupled to the memory; and software components executed by the processor that are configured to:

display a multi-level hierarchical visualization of nodes including a node representing a collapsed sub-hierarchy that is displayed using a collapsed sub-hierarchy symbol that is not applied to regular nodes;

responsive to a user invoking a contextual search by performing a user gesture on the collapsed sub-hierarchy symbol, display a contextual search dialog box located adjacent to the collapsed hierarchy symbol that displays a text entry field for the user to enter search criteria that is contextual only to the collapsed sub-hierarchy, wherein the contextual search dialog further displays a total number of hidden units comprising the collapsed sub-hierarchy;

responsive to the user entering the search criteria, display search results comprising any nodes from the collapsed sub-hierarchy matching the search criteria, wherein the search results are displayed directly in the contextual search dialog box to control the size of the hierarchical visualization;

receive a user selection of which ones of the matching nodes from the collapsed sub-hierarchy to show in the hierarchical visualization; and display a partial rendering of the collapsed sub-hierarchy that shows the selected matching nodes while keeping remaining non-matching nodes hidden, wherein other nodes linked to the matching nodes representing a collapsed sub-hierarchy are displayed using the collapsed sub-hierarchy symbol that is not applied to regular nodes.

6. The computer of claim 5, wherein in response to displaying any nodes from the collapsed sub-hierarchy matching the search criteria, the software components are further configured to:

perform a partial search of only the collapsed sub-hierarchy for hidden nodes containing the search criteria; and display in the contextual search dialog a subset of the nodes from the collapsed sub-hierarchy returned from the partial search that match the search criteria.

\* \* \* \* \*